United States Patent
Wang et al.

(10) Patent No.: US 11,941,507 B2
(45) Date of Patent: Mar. 26, 2024

(54) DATA FLOW METHOD AND APPARATUS FOR NEURAL NETWORK COMPUTATION BY DETERMINING INPUT VARIABLES AND OUTPUT VARIABLES OF NODES OF A COMPUTATIONAL GRAPH OF A NEURAL NETWORK

(71) Applicant: ZHEJIANG LAB, Hangzhou (CN)

(72) Inventors: Hongsheng Wang, Hangzhou (CN); Guang Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/954,109

(22) Filed: Sep. 27, 2022

(65) Prior Publication Data

US 2024/0054319 A1    Feb. 15, 2024

Related U.S. Application Data

(63) Continuation of application No. PCT/CN2022/116171, filed on Aug. 31, 2022.

(30) Foreign Application Priority Data

Aug. 10, 2022   (CN) .................. 202210952808.4

(51) Int. Cl.
   *G06N 3/04* (2023.01)
   *G06F 18/20* (2023.01)
(52) U.S. Cl.
   CPC ............... *G06N 3/04* (2013.01); *G06F 18/29* (2023.01)
(58) Field of Classification Search
   CPC ....................................................... G06N 3/04
   See application file for complete search history.

(56) References Cited

U.S. PATENT DOCUMENTS

| 2019/0279086 A1 | 9/2019 | Nicol et al. |
| 2020/0151580 A1 | 5/2020 | Horesh et al. |
| 2021/0174190 A1 | 6/2021 | Janssen et al. |

(Continued)

FOREIGN PATENT DOCUMENTS

| CN | 104268023 A | 1/2015 |
| CN | 110941494 A | 3/2020 |
| CN | 111045959 A | 4/2020 |

(Continued)

OTHER PUBLICATIONS

Alsentzer et al. Subgraph Neural Networks. 34th Conference on Neural Information Processing Systems (NeurIPS 2020), Vancouver, Canada. (Year: 2020).*

(Continued)

*Primary Examiner* — Alexey Shmatov
*Assistant Examiner* — Robert Bejcek, II
(74) *Attorney, Agent, or Firm* — IPro, PLLC

(57) ABSTRACT

Disclosed are a data flow method and apparatus for neural network computation. The data flow method for neural network computation includes initializing the lifecycle of a variable in a computational graph; and defining a propagation rule for a variable in use to flow through a node. A definition of the variable is produced at a precursor node of the node, such that an input set of valid variables flowing through the node contains the variable. The method may be used on neural network computation in a deep learning training system.

3 Claims, 6 Drawing Sheets

(56) References Cited

U.S. PATENT DOCUMENTS

2021/0342087 A1   11/2021  Simenec et al.
2022/0019874 A1*   1/2022  Pfeil ...................... G06N 3/045

FOREIGN PATENT DOCUMENTS

| | | |
|---|---|---|
| CN | 111338635 A | 6/2020 |
| CN | 112527502 A | 3/2021 |
| CN | 114186687 A | 3/2022 |
| CN | 114365148 A | 4/2022 |
| CN | 114461351 A | 5/2022 |
| CN | 114746871 A | 7/2022 |
| WO | 2021219211 A1 | 11/2021 |

OTHER PUBLICATIONS

Du Wei-Jian et al. QingLong: A Neural Network Programming Model Based on Asynchronous Constant and Variable. Chinese journal of computers, vol. 43 No. 4. Apr. 15, 2020.
Chen, Juan, and Zongling Wu. "Dynamic computation offloading with energy harvesting devices: A graph-based deep reinforcement learning approach." IEEE Communications Letters 25.9 (2021): 2968-2972.

* cited by examiner

DATA FLOW METHOD AND APPARATUS FOR NEURAL NETWORK COMPUTATION BY DETERMINING INPUT VARIABLES AND OUTPUT VARIABLES OF NODES OF A COMPUTATIONAL GRAPH OF A NEURAL NETWORK

CROSS REFERENCE TO RELATED APPLICATIONS

The present application claims priority to Chinese Patent Application No. CN202210952808.4 entitled "Data Flow Method and Apparatus for Neural Network Computation" and filed with China National Intellectual Property Administration on Aug. 10, 2022, the entire contents of which are incorporated herein by reference.

TECHNICAL FIELD

The present application relates to the field of computer systems for specific computational models, in particular to a data flow method and apparatus for neural network computation.

BACKGROUND

With the rapid development of industrial applications of artificial intelligence, large-scale training systems for deep neural network models are increasingly becoming research hotspots in academia and industrial circle. At the local scope, the existing approach of data transfer between subgraphs for neural network computation is frequent swapping with memory through computational nodes, and a data flow algorithm needs to be designed for each subgraph. In the global scope, this approach cannot meet the data flow efficiency of computing the subgraph with a cycle structure.

SUMMARY

An objective of the present application is to provide a data flow method and apparatus for neural network computation to overcome the deficiencies in the prior art.

In order to achieve the above object, the present application provides the following technical solution.

The present application discloses a data flow method for neural network computation including the following steps:
  step 1, initializing the lifecycle of a variable in a computational graph, i.e., initializing a time period from the start of a definition of the variable to the end of use as the lifecycle of the variable in the computational graph;
  step 2, defining a propagation rule for a variable in use to flow through a node, i.e., defining that in the case that a variable at a certain node in the computational graph is used, a definition of the variable is produced at a precursor node of the node, such that an input set of valid variables flowing through the node contains the variable;
  step 3, designing a propagation rule for a redefined variable to flow through the node, i.e., when the variable is redefined at a certain node in the computational graph, ending the lifecycle of the variable at a precursor node of the node while the variable flows through the node;
  step 4, defining a propagation rule for an associated variable to flow through a node in the computational graph;
  step 5, analyzing valid variables input and output at each node based on a data stream;
  step 6, collecting a set of valid variables before and after flowing through a node, and collecting a set of valid variables flowing through each node obtained by analysis based on the lifecycles of the variables in the computational graph;
  step 7, allocating memory cell blocks for valid variables on edges of the computational graph;
  step 8, defining a propagation rule for available expressions in the computational graph;
  step 9, analyzing available expressions input and output at each node based on the data stream; and
  step 10, optimizing the available expressions in the computational graph: saving computation results of the available expressions at the nodes in the computational graph into intermediate variables, and replacing the available expressions appearing again in a successor node with the intermediate variables.

Preferably, in the step 3, the propagation rule for the redefined variable to flow through the node is specifically as follows: if the variable is not redefined at a certain node in the computational graph, a variable in an output set of valid variables flowing through the node can flow through the node to be propagated to variables of the input set; and if the variable is redefined at the node in the computational graph, the variable may not flow through the node.

Preferably, the step 4 includes the following specific sub-steps:
  step 4.1, defining that a variable flowing through a certain node in the computational graph is equal to a use variable;
  step 4.2, defining a set of output variables at the node as a union of input sets of all successor nodes of the node; and
  step 4.3, defining a set of input variables at the node as that obtained by removing a set of variables defined at the node from the set of output variables, and then taking a union with a set of use variables at the node.

Preferably, the step 5 includes the following specific sub-steps:
  step 5.1, initializing a set of input valid variables at an output node, wherein for the output node in the entire computational graph, a set of output valid variables is an empty set, and the set of input valid variables is derived by removing variables redefined at the node from the set of output valid variables, and taking a union with variables used at the node;
  step 5.2, initializing a set of output valid variables at an input node, i.e., for the input node in the entire computational graph, initializing elements of the set of output valid variables as the variables defined at the node;
  step 5.3, deriving a set of output valid variables at an intermediate node, wherein the set of output valid variables at the intermediate node is obtained by taking a union of input valid variables at successor nodes of the intermediate node; and
  step 5.4, deriving a set of input valid variables at the intermediate node, wherein the set of input valid variables at the intermediate node is obtained by removing variables redefined at the node from the set of output valid variables, and taking a union with variables used at the node.

Preferably, in the step 7, conditions for allocating the memory cell block for the variable at the certain node in the computational graph are defined as follows: the memory cell block is only allocated for a valid variable on the edge of the computational graph during the lifecycle of the variable at the node, and during the compilation of the computational graph, the memory cell block is allocated for each variable in advance according to the number of variables in the above set of valid variables collected.

Preferably, the step 8 includes the following specific sub-steps:
step 8.1, defining that a variable flowing through a certain node in the computational graph is equal to a use variable;
step 8.2, defining a set of input variables at the node as an intersection of sets of output variables at precursor nodes of the node; and
step 8.3, defining a set of output variables at the node as that obtained by taking a union of the set of all input variables at the node and use variables, and then removing an expression containing redefined variables.

Preferably, the step 9 includes the following specific sub-steps:
step 9.1, initializing a set of available expressions, i.e., initializing a set of available expressions flowing into an entry node in the entire compute graph as an empty set;
step 9.2, adding newly appearing expressions in successor nodes into the set of available expressions, wherein for a node with multiple input edges, available expressions at the node use an intersection of sets of available expressions on the multiple input edges as a newly added element in the set of available expressions at the node; and
step 9.3, for successor nodes where there is a redefined variable at an available node, removing an expression containing the redefined variable from the set of available expressions.

Preferably, the step 10 includes the following specific sub-steps:
step 10.1, computing the available expressions separately;
step 10.2, saving the computation results of the available expressions at the nodes in the computational graph into the intermediate variables;
step 10.3, for a successor node where there is no redefined variable in the available expressions, replacing the available expressions in the successor node with values of the intermediate variables; and
step 10.4, for a successor node where there are redefined variables in the available expressions, inserting update nodes of the available expressions.

The present application also discloses a data flow apparatus for neural network computation, including a memory and one or more processors, wherein the memory stores executable codes, and when the executable codes are executed by the one or more processors, the above data flow method for neural network computation is implemented.

The present application has the following beneficial effects: the data flow method and apparatus for neural network computation disclosed by the present application can analyze the memory cell blocks required for the nodes in each computational subgraph in a local loop from the perspective of the global scope. The data flow method for neural network computation improves the computational efficiency of the overall computational graph and saves time costs. In the development process of the distributed model by researchers and engineers, the neural the model is built by using the data flow method for neutral network computation, so that the computation efficiency of the neutral network is high, memory resources are saved, and memory resource efficient, and the development of large-scale landing application of the deep neutral network model is promoted.

DETAILED DESCRIPTION

In order that the objectives, technical solutions and advantages of the present application will become more apparent, the present application will be described in further detail below by means of the accompanying drawings and embodiments. However, it should be understood that the specific embodiments described herein are only used for explaining the present application and are not intended to limit the scope of the present application. Further, in the following description, descriptions of well-known structures and techniques are omitted so as to avoid unnecessarily obscuring the concepts of the present application.

An embodiment of the present application provides a data flow method for neural network computation, including the following steps:
step 1, initializing the lifecycle of a variable in a computational graph;
step 2, defining a propagation rule for a variable in use to flow through a node;
step 3, designing a propagation rule for a redefined variable to flow through the node;
step 4, defining a propagation rule for an associated variable to flow through a node in the computational graph;
step 5, analyzing valid variables input and output at each node based on a data stream;
step 6, collecting a set of valid variables before and after flowing through a node;
step 7, allocating memory cell blocks for valid variables on edges of the computational graph;
step 8, defining a propagation rule for available expressions in the computational graph;
step 9, analyzing available expressions input and output at each node based on the data stream; and step 10, optimizing the available expressions in the computational graph.

In the step 1, the lifecycle of the variable in the computational graph is initialized: a time period from the start of a definition of the variable to the end of use is initialized as the lifecycle of the variable in the computational graph.

Figure 1:
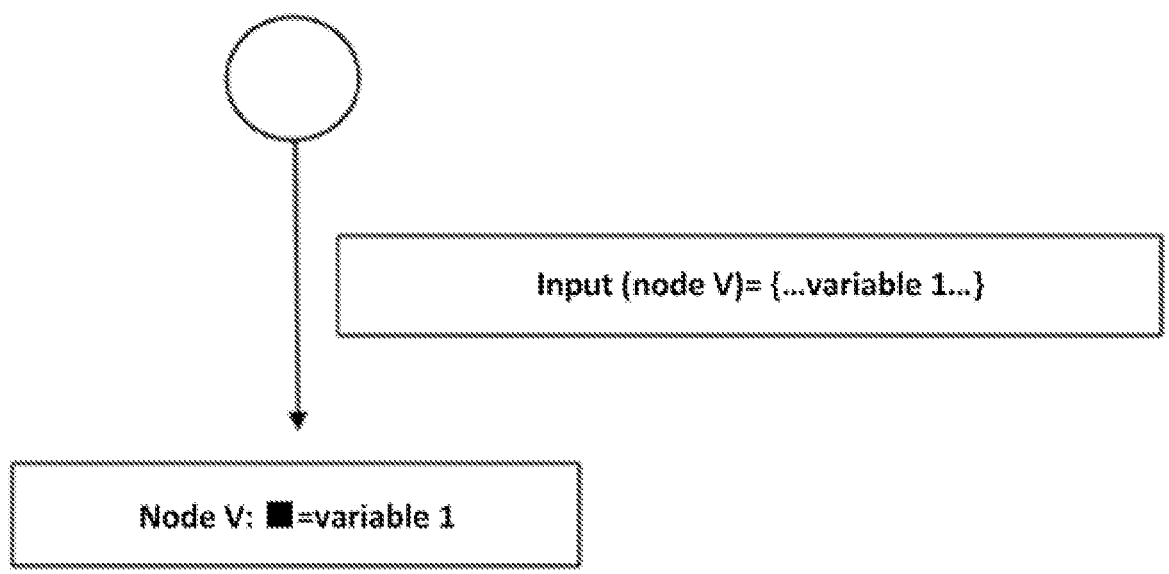
FIG. 1 is a schematic diagram illustrating a propagation rule for a variable in use in accordance with an embodiment of the present application.

In the step 2, the propagation rule for the variable in use to flow through the node is defined. It is known that a given computational graph G (E, V), where E is an edge of the computational graph G, and V is a node of the computational graph G. At node V, if variable 1 is used, a precursor node of node V certainly produces the definition of variable 1, so that an input set of valid variables flowing through node V certainly contains variable 1. The propagation rule for the variable in use is as shown in FIG. 1. The identification "■" in the embodiment represents indicate that an expression of the location may be an arbitrary expression.

Figure 2:
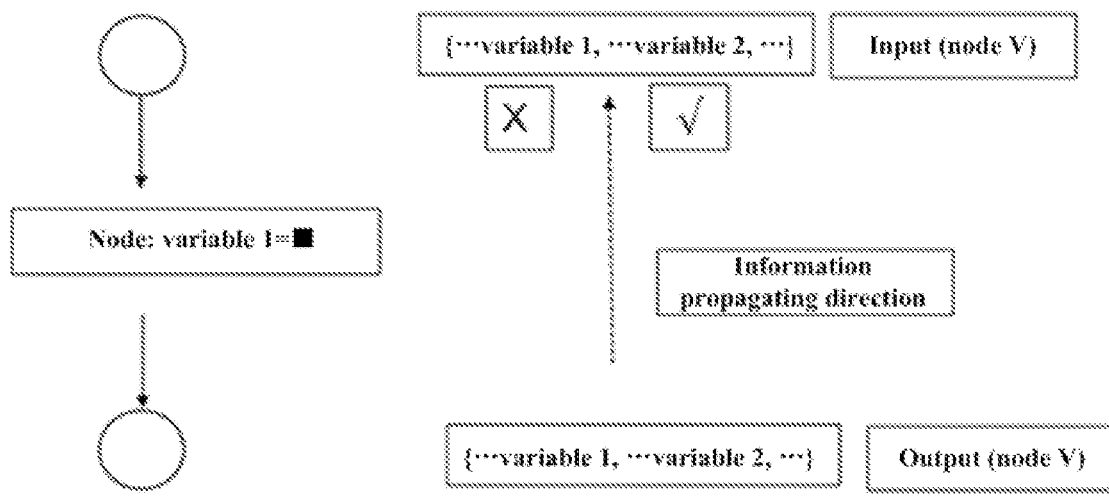
FIG. 2 is a schematic diagram illustrating a propagation rule for a redefined variable in accordance with an embodiment of the present application.

In the step 3, the propagation rule for the redefined variable to flow through the node is designed. At node V, if variable 1 is redefined, the lifecycle of variable 1 at the precursor node of node V is ended when variable 1 flows through node V. That is, variable 1 of output node V is invalid, and variable 1 is not included in the input set of valid variables flowing through node V. Since variable 1 is redefined at node V, an output set of valid variables flowing through node V contains variable 1. Variable 1 in the output set cannot flow through node V to be propagated into the input set. The propagation rule for the redefined variable is as shown in FIG. 2. From the perspective of node V, the propagation rule can be summarized as follows: if a variable is not redefined at node V, variables in the output set of valid variables flowing through node V can flow through node V to be propagated to variables of the input set, as a variable 2 in FIG. 2; and conversely, the variable cannot flow through node V, as a variable 1 in FIG. 2.

Figure 3:
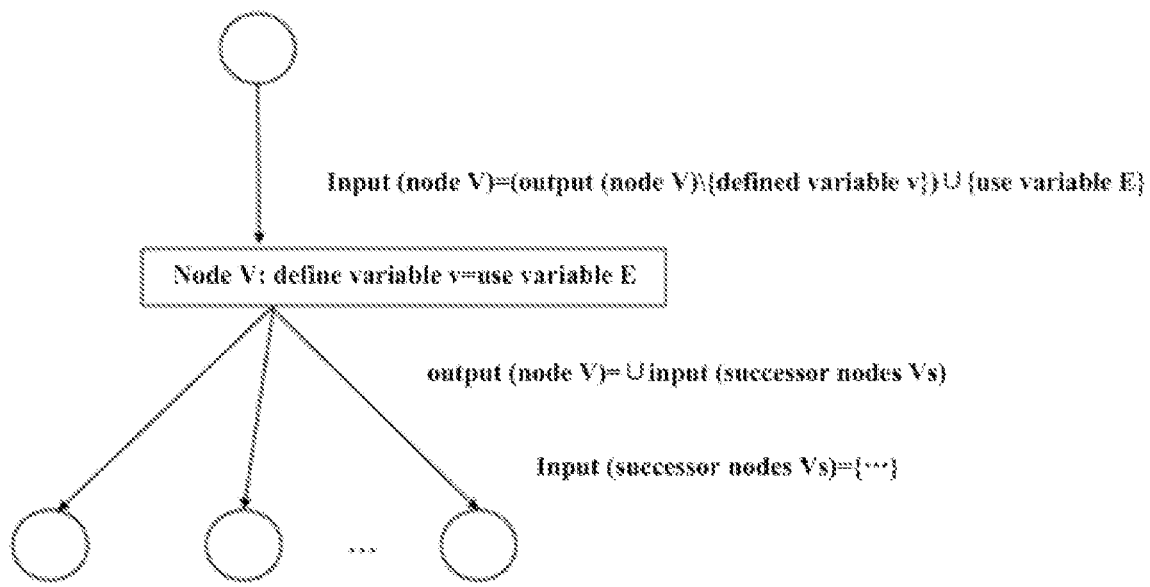
FIG. 3 is a schematic diagram illustrating a definition of a data flow diagram in accordance with an embodiment of the present application.

In the step 4, the propagation rule for the associated variable to flow through the node in the computational graph is defined, as shown FIG. 3. Defining the propagation rule for the associated variable to flow through the node in the computational graph includes the following process:
(1) For node V in the computational graph: variable v=use variable E is defined;
(2) A set of output variables at a node is defined. The set of output variables at node V is defined as a union of input sets of all successor nodes of node V. The set of output variables at node V is expressed as: output (node V)=U input (successor nodes Vs), Vs∈successor node (V);
(3) A set of input variables at the node is defined. The set of input variables at node V is defined as that obtained by removing a set of variables v defined at node V from the set of output variables, and then taking a union with a set of use variables E at the node V. The set of input variables at node V is expressed as: input (node V)= (output (node V)\{defined variable v})∪{use variable E}.

Figure 4:
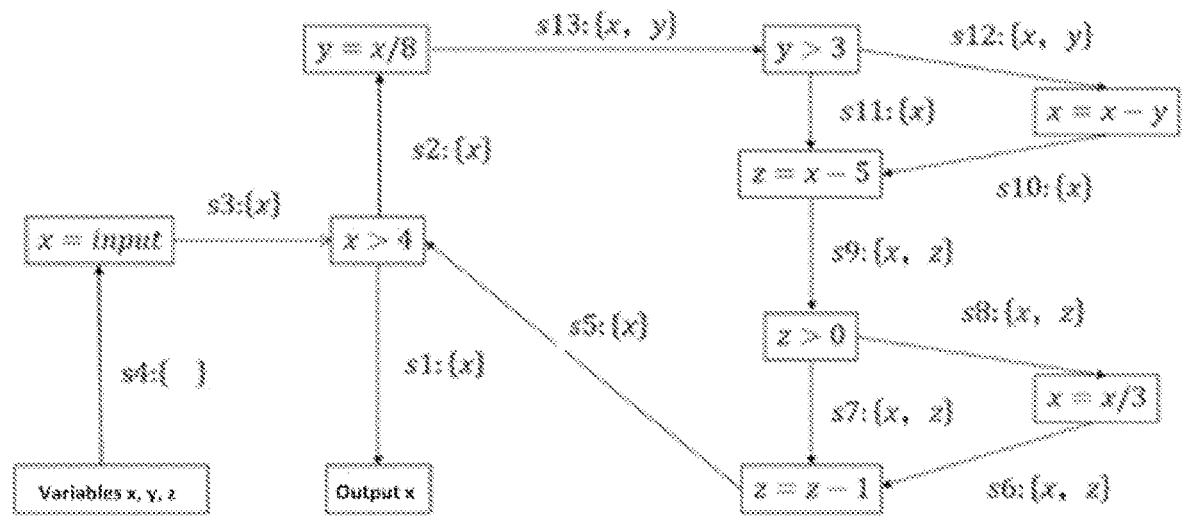
FIG. 4 is a schematic diagram illustrating an analysis for the lifecycle of a variable in a computational graph based on a data flow diagram in accordance with an embodiment of the present application.

In the step 5, valid variables input and output at each node are analyzed based on the data stream, as shown in FIG. 4.

The lifecycle of a global variable in the computational graph is analyzed based on the data flow step by step, wherein Si:{ . . . } represents a set of valid variables flowing through a corresponding node obtained by the analysis in an ith step. FIG. 4 shows a set of global valid variables flowing through inputs and outputs of the respective nodes throughout the computational graph. "{ }" appearing in the embodiment represents an empty set; x=input represents that an input tensor variable is assigned to a tensor variable x.

Analyzing the valid variables input and output at each node based on the data stream includes the following process.
(1) A set of input valid variables at an output node is initialized. For the output node of the entire computational graph, a set of output valid variables is an empty set, and the set of input valid variables is derived by removing variables redefined at the output node from the set of output valid variables, and taking a union with variables used at the node. Therefore, the set of input valid variables is the union of the empty set and the output variables, and includes output variable elements, as S1: {x} in FIG. 4.
(2) a set of output valid variables at an input node is initialized. For the input node in the entire computational graph, and elements of the set of output valid variables are initialized as the variables defined at the node, as S3: {x} in FIG. 4.
(3) a set of output valid variables at an intermediate node is derived. The set of output valid variables at the intermediate node is obtained by taking a union of input valid variables at successor nodes of the intermediate node. As shown in FIG. 4, for a node x.shape[0]>520, a set of output valid variables is: a union of a set S2:{x} of input valid variables at a successor node y=x/8, so that a set of output valid variables is S2:{x}. Similarly, for a node z=tf.nn.relu(z), a set of output valid variables is S5:{x}.

A set of input valid variables at the intermediate node is derived. The set of input invalid variables at the intermediate node is obtained by removing variables redefined at the node from the set of output valid variables, and taking a union with variables used at the node. As shown in FIG. 4, for the node x.shape[0]>520, a set of input valid variables is obtained by removing variables redefined at the node from the set S2:{x} of input valid variables, and taking a union with variables used at the node. Finally the set of input valid variables is S3:{x}. Similarly, for the node z=tf.nn.relu(z), a set of input valid variables is a set S7:{x,z} on an entry edge and a set S6:{x,z} on the entry edge. For a node x=x/3, a set of input valid variables is obtained by removing a redefined variable {x} from the set S6:{x,z} of input valid variables, and taking a union with a use variable {x}. The set of input valid variables is finally S8:{x,z}. For a node z>0, a set of input valid variables is a union of sets of input valid variables of successor nodes of the node, thereby being S9:{x,z}.

In the step 6, the set of valid variables before and after flowing through the node is collected. A set of valid variables flowing through each node obtained by analysis of the lifecycle of each variable in the computational graph based on a data flow graph is collected.

In the step 7, memory cell blocks are allocated for valid variables on edges of the computational graph. Conditions for allocating a memory cell block for the variable 1 at the node V i are defined as follows: the memory cell block is only allocated for the valid variable during the lifecycle of the variable 1 at the node V. During the compilation of the computational graph, the memory cell block is allocated for each variable in advance according to the number of variables in the above set of valid variables collected.

Figure 5:
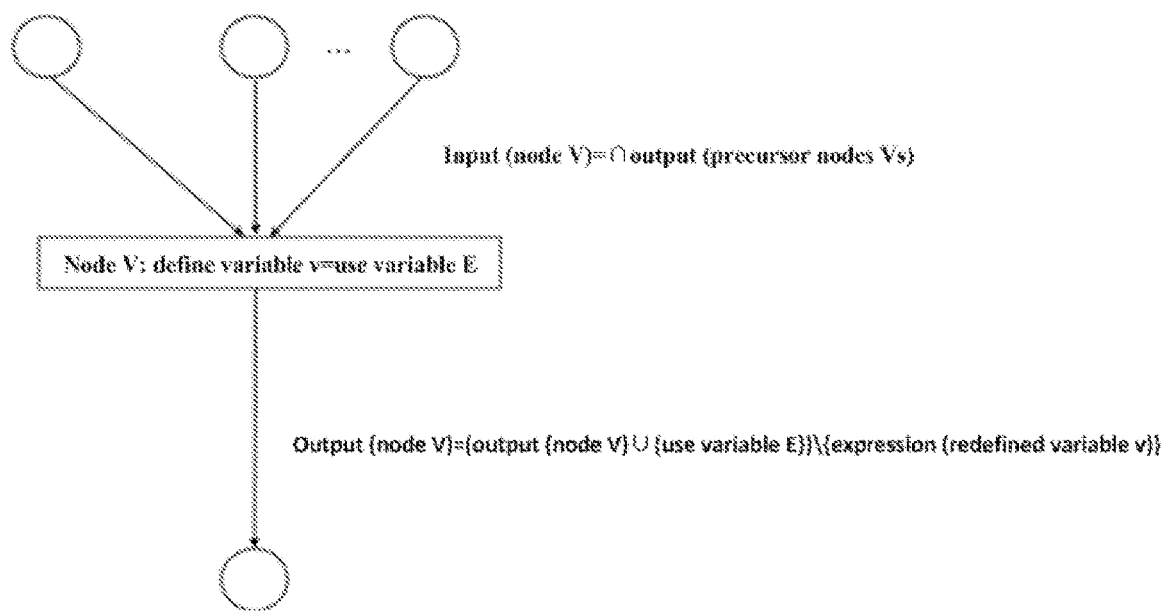
FIG. 5 is a data flow diagram defining expressions available in a computational graph in accordance with an embodiment of the present application.

In the step 8, the propagation rule for the available expressions in the computational graph is defined, as shown in FIG. 5.

Defining the propagation rule for the available expressions in the computational graph includes the following process.

(1) For the node V in the computational graph, variable v=use variable E is defined.

(2) A set of input variables at the node is defined. A set of input variables at the node V is defined as an intersection of sets of output variables at precursor nodes of the node V. The set of input variables at the node V is expressed as: input (node V)=∩output (precursor nodes Vs), Vs∈precursor node (V).

(3) A set of output variables at the node is defined. The set of output variables at the node V is defined as that obtained by taking a union of the set of all input variables at the node V and use variables E, and then removing an expression containing redefined variables. The set of output variables at the node V is expressed as: output (node V)=(output (node V)∪{use variable E})\{expression (redefined variable v)}.

Figure 6:
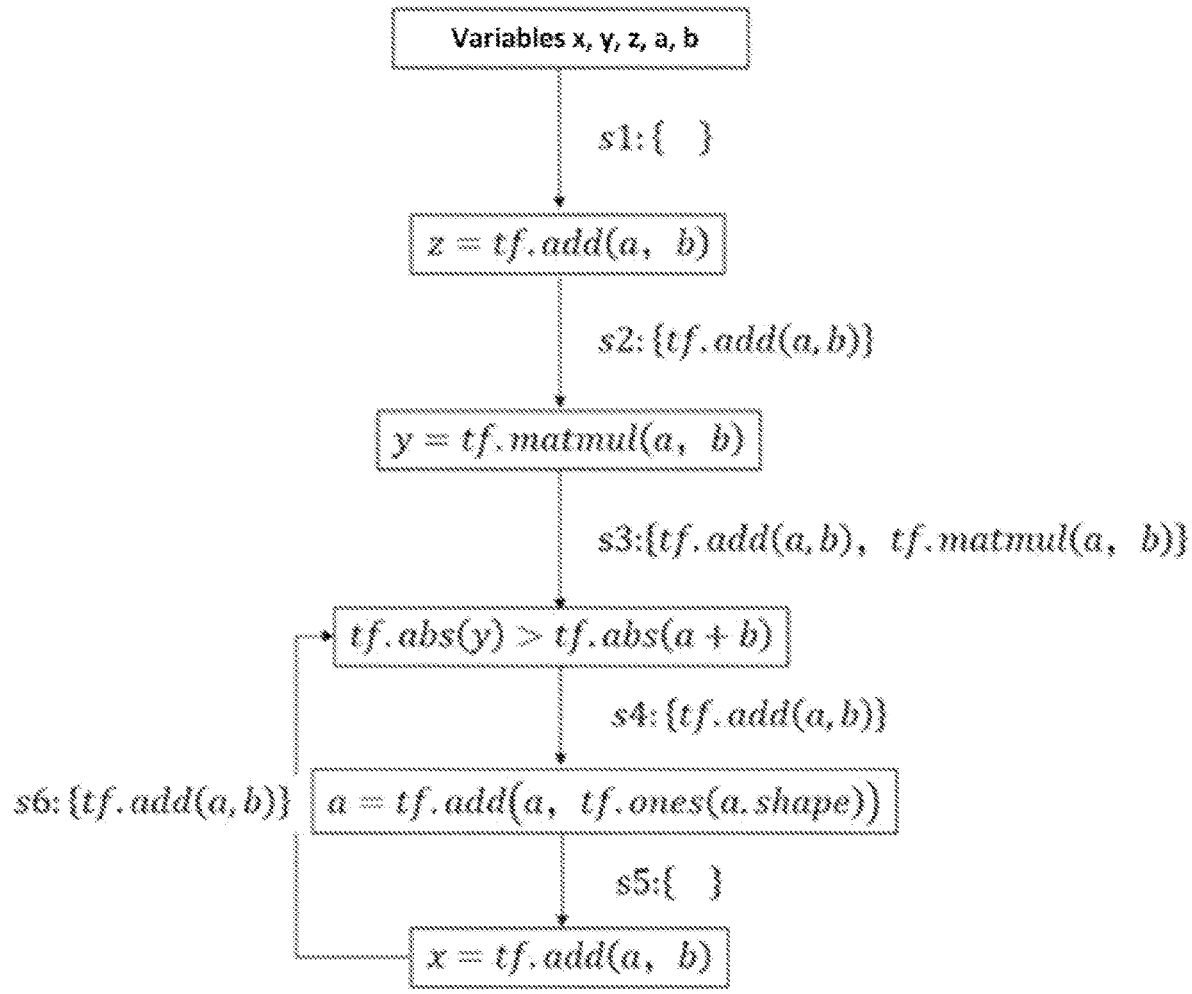
FIG. 6 is a schematic diagram illustrating available expressions for analyzing inputs and outputs at each node based on a data stream in accordance with an embodiment of the present application.

In the step 9, available expressions input and output at each node is analyzed based on the data stream, as shown in FIG. 6.

The available expressions of global expressions in the computational graph are analyzed step by step based on the data flow graph, where Si:{ . . . } represents a set of available expressions flowing through a corresponding node obtained by the analysis in an ith step. FIG. 6 shows a set of global available expressions flowing through inputs and outputs of the respective nodes throughout the computational graph.

tf.add(x,y) represents an addition operation of a tensor x and a tensor y;

tf.abs(y) represents taking an absolute value of the tensor y;

tf.matmul(x,y) represents a matrix multiplication operation of the tensor x and the tensor y;

tf.ones(a.shape) represents the creation of a tensor that has the same shape as a tensor a and all elements being 1.

analyzing the available expressions input and output at each node based on the data stream includes the following steps.

Step 1, a set of available expressions is initialized. A set of available expressions flowing into an entry node in the entire compute graph is initialized as an empty set, as step s1 in FIG. 6.

Step 2, newly appearing expressions in successor nodes are added into the set of available expressions. For a node with multiple input edges, available expressions at the node use an intersection of sets of available expressions on the multiple input edges as a newly added element in the set of available expressions at the node. As shown in steps s2, s3 and s4 in FIG. 6, for a node tf.abs(y)>tf.abs(tf.add (a, b)) corresponding to the set in s4, the set of available expressions at the node is derived as follows: since there are two input edges for the node, the set of available expressions at the node is the intersection of the sets of available expressions on the two input edges, i.e., the intersection of s3 and s6.

Step 3, for successor nodes where there is a redefined variable at an available node, an expression containing the redefined variable needs to be removed from the set of available expressions, as shown in step s5 in FIG. 6. For a node x=tf.add(a,b) corresponding to a set in s5, the available expressions at the node is derived as follows: since a variable a is redefined at a precursor node a=tf.add(a,tf.ones (a.shape)), the computation result of the available expression tf.add(a,b) contained by the set of available expressions s4:{tf.add(a,b)} at the precursor node changes. Therefore, the expression tf.add(a,b) containing the redefined variable a needs to be removed from the set of available expressions s4:{tf.add(a,b)} at the node, and the set of available expressions corresponding to the node is an empty set finally.

In the step 10, the available expressions in the computational graph are optimized. The computation results of the available expressions at the nodes in the computational graph are saved into intermediate variables, and available expressions that reappear in successor nodes are replaced with the intermediate variables. The purpose of optimizing the available expressions is to reduce recomputation the same available expressions at the successor nodes, increase the computational efficiency of the overall computational graph, and save time costs. Optimizing the available expressions in the computational graph includes the following process.

(1) The available expressions are computed. The available expressions are computed separately.

(2) The computation results of the available expressions are saved into the intermediate variables.

(3) For a successor node where there is no redefined variable in the available expressions, the available expressions in the successor node are replaced with values of the intermediate variables.

(4) For a successor node where there is a redefined variable in the available expression, an update node of the available expression is inserted. Since the variable in the available expression is redefined at the successor node, resulting in a change in the computation result of the available expression contained by the precursor nodes. Then, an updated node for the computation result of the available expression needs to be inserted.

Figure 7:
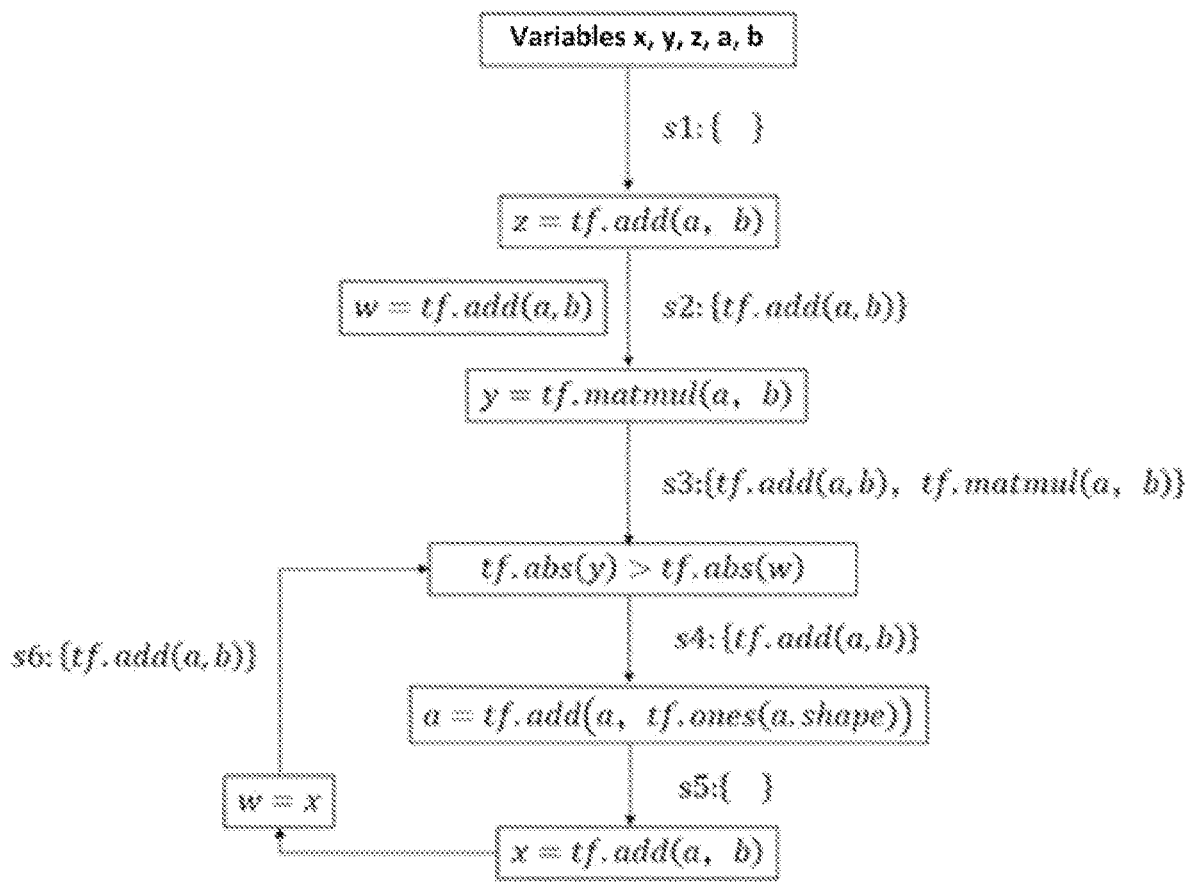
FIG. 7 is a schematic diagram illustrating optimization of available expressions in a computational graph in accordance with an embodiment of the present application.

The process of optimizing the available expressions in the computational graph is as shown in FIG. 7. In step s2, the computation result of the available expression tf.add(a,b) is saved into a variable w, the available expression tf.add(a,b) in the successor node tf.abs(y)>tf.abs(tf.add(a,b)) is replaced with the value of the variable w. There is no available expression in step s5, resulting in a change in the computation result of the available expression tf.add(a,b) contained by the precursor node. Therefore, a node for update of the variable w is inserted, as w=x.

Figure 8:
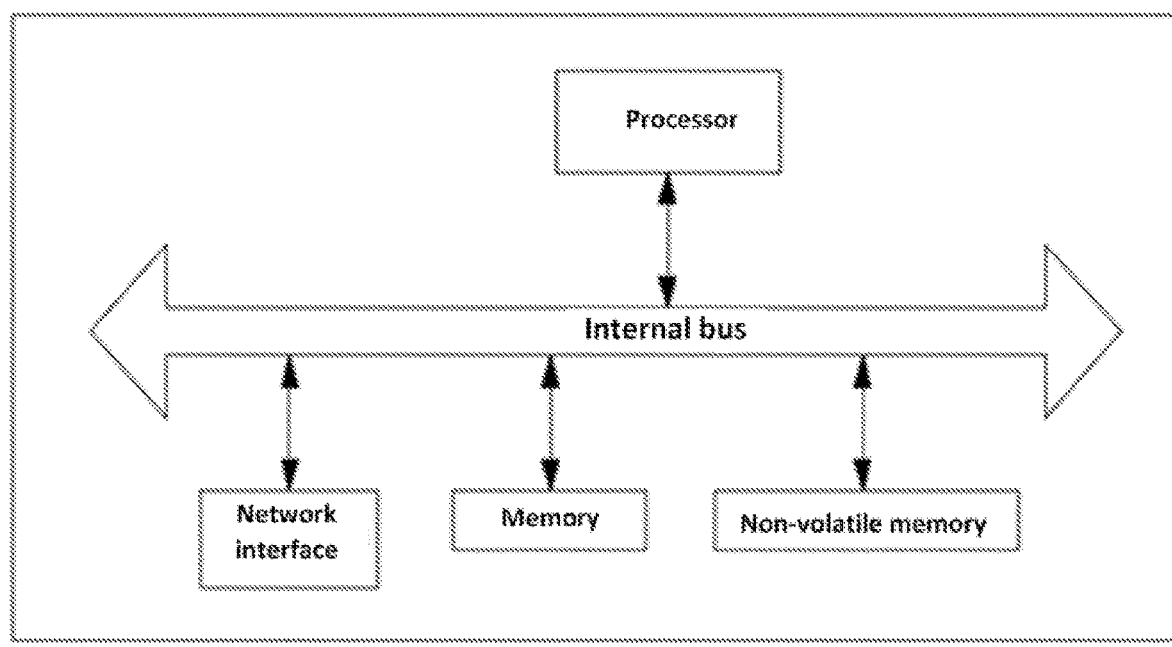
FIG. 8 is a schematic diagram illustrating a data flow apparatus for neural network computation in accordance with an embodiment of the present application.

With reference to FIG. 8, an embodiment of the present application also provides a data flow apparatus for neural network computation, further including a memory and one or more processors, wherein the memory stores executable codes, and when the executable codes are executed by the one or more processors, the data flow method for neural network computation in the above embodiment is implemented.

The embodiment of the data flow apparatus for neural network computation may be applied to any data processing capable device, which may be a device or apparatus such as a computer. The embodiment of the apparatus may be implemented by software, or by hardware or by a combination of hardware and software. Taking the implementation by software as an example, an apparatus in a logical sense is formed by reading, by a processor of any data processing capable device, corresponding computer program instructions in a non-volatile memory into a memory. From the hardware level, as shown in FIG. 8 which is a hardware diagram of any data processing capable device in which the data flow apparatus for neural network computation is located. In addition to a processor, a memory, a network interface, and a non-volatile memory shown in FIG. 8. In the embodiment, any data processing capable device in which the apparatus is located may also include other hardware, which is not described in detail here. The implementation process of the functions and effects of various units in the above apparatus is particularly detailed in the implementation process of the corresponding steps in the above method, which is not described in detail here.

The apparatus embodiments substantially correspond to the method embodiments, so that reference may be made to the partial descriptions of the method embodiments for relevant parts. The above described apparatus embodiments are merely illustrative, wherein units described as separate components may be or may not be physically separated, and components shown as units may be or may not be physical units, i.e., may be located in one place or may be distributed to a plurality of network units. Some or all of the modules may be selected according to practical needs to achieve the objectives of the solutions of the present application. Those of ordinary skill in the art can understand and implement the solutions without inventive step.

An embodiment of the present application also provides a computer readable storage medium having a program stored thereon, wherein the program, when executed by a processor, implements the data flow method for neural network computation in the above embodiment.

The computer readable storage medium may be an internal storage unit, e.g., a hard disk or a memory, of any data processing capable device according to any one of the preceding embodiments. The computer readable storage medium may also be an external storage device of any data processing capable device, such as a plug-in hard disk, Smart Media Card (SMC), SD card, Flash Card, etc., equipped on the device. Further, the computer readable storage medium can also include both an internal storage unit and an external storage device of any data processing capable device. The computer readable storage medium is used to store the computer program and other programs and data required by any data processing capable device, but may also be used to temporarily store data that has been or will be output.

The above descriptions are merely preferred embodiments of the present application and are not intended to limit the present application. Any modifications, equivalent replacements or improvements, or the like, which are made within the spirit and principles of the present application, are included within the scope of protection of the present application.

What is claimed is:

1. A data flow method for neural network computation, comprising the following steps:
   step 1, initializing a lifecycle of a variable in a computational graph, which comprises initializing a time period from a start of a definition of the variable to an end of use as the lifecycle of the variable in the computational graph;
   step 2, defining a propagation rule for a variable in use to flow through a node in the computational graph, which comprises defining that, when the variable at the node in the computational graph is used, a definition of the variable is produced at a precursor node of the node, such that an input set of valid variables flowing through the node contains the variable;
   step 3, designing the propagation rule for a redefined variable to flow through the node, which comprises, when the variable is redefined at the node in the computational graph, ending the lifecycle of the variable at the precursor node of the node while the variable flows through the node;
   step 4, defining the propagation rule for an associated variable to flow through the node in the computational graph;
   step 5, analyzing valid variables input and output at each node in the computation graph based on a data stream; wherein the step 5 comprises the following specific sub-steps
   step 5.1, initializing a set of input valid variables of the each node, wherein for the each node in the computational graph, a set of output valid variables is an empty set, and the set of input valid variables is derived by removing variables redefined at the each node from the set of output valid variables, and taking a union with all variables used at the each node;
   step 5.2, initializing the set of output valid variables of the each node, which comprises, for the each node in the computational graph, initializing elements of the set of output valid variables as variables defined at the each node;
   step 5.3, deriving a set of output valid variables of an intermediate node in the computational graph, wherein the set of output valid variables of the intermediate node is obtained by taking a union of input valid variables of all successor nodes of the intermediate node; and
   step 5.4, deriving a set of input valid variables of the intermediate node, wherein the set of input invalid variables at the intermediate node is obtained by removing variables redefined at the intermediate node from the set of output valid variables of the intermediate node, and taking a union with variables used at the intermediate node;
   step 6, collecting a set of valid variables before and after flowing through the node, and collecting the set of valid variables flowing through the each node obtained by analysis based on lifecycles of variables in the computational graph;
   step 7, allocating memory cell blocks for valid variables on edges of the computational graph; wherein in the step 7, conditions for allocating the memory cell blocks for the variable at the certain node in the computational graph are defined as follows: the memory cell blocks are only allocated for the valid variables on the edges of the computational graph during the lifecycle of the variable at the node, and during compilation of the computational graph, the memory cell blocks are allocated for each variable in advance according to a number of variables in the set of valid variables collected;
   step 8, defining the propagation rule for available expressions in the computational graph;
   step 9, analyzing the available expressions input and output at the each node based on the data stream; and
   step 10, optimizing the available expressions in the computational graph, which comprises saving computation results of the available expressions at the nodes in the computational graph into intermediate variables, and replacing the available expressions appearing again in a successor node with the intermediate variables;
   configuring a computer system according to the computational graph such that the computer system implements the neural network.

2. The method according to claim 1, wherein the available expressions of the each node is determined as:
   a set difference of: (A) a union of (a) an intersection of the sets of available expressions of all precursor nodes of the each node, and (b) newly appearing expressions in the each node;
   and (B) any available expressions containing any variable defined at the each node.

3. An apparatus, comprising a non-transitory memory and one or more processors, wherein the non-transitory memory has instructions recorded therein, the instructions when executed by the one or more processors implementing the method according to claim 1.

\* \* \* \* \*